Oct. 11, 1938.　　　E. J. NACHTWEY　　　2,132,576
AUTOMATICALLY ADJUSTABLE BRAKE
Filed Aug. 8, 1936　　　2 Sheets-Sheet 1

Edward J. Nachtwey
INVENTOR.

BY Nelson Moore
ATTORNEYS.

Oct. 11, 1938.   E. J. NACHTWEY   2,132,576
AUTOMATICALLY ADJUSTABLE BRAKE
Filed Aug. 8, 1936   2 Sheets-Sheet 2

Edward J. Nachtwey
INVENTOR.

BY Nelson Moore.
ATTORNEYS.

Patented Oct. 11, 1938

2,132,576

UNITED STATES PATENT OFFICE 2,132,576

AUTOMATICALLY ADJUSTABLE BRAKE

Edward J. Nachtwey, Green Bay, Wis.

Application August 8, 1936, Serial No. 94,996

20 Claims. (Cl. 188—79.5)

The present invention concerns improvements in mechanical brakes.

It is broadly the object of the invention to make possible uniform action of all the brakes of a vehicle regardless of the states of wear of the individual braking material or the adjustment of the brake shoes with respect to the surface of the brake drum.

It is an object of the invention to provide means whereby the action of the brake lever or foot-pedal which the operator uses to actuate the brakes is always the same regardless of the condition of the brakes. A certain position of the pedal will cause a definite braking action thus eliminating a tight pedal when the brakes are new and a loose pedal when the linings are somewhat worn. Formerly a lining would wear until the pedal would be too loose to apply pressure and an adjustment would be required even though the lining were only one-fourth or one-fifth worn out.

It is an object of the invention to provide this constant pedal action whether the brakes are operated in multiple, as in an automobile, or singly as on some motorcycles.

It is an object of the invention to eliminate the necessity of brake adjustment. The adjustment requiring skill is made at the automobile factory by skilled workmen.

Other objects will appear as the invention is described in detail.

In the drawings similar reference characters indicate like parts throughout the various views.

Figure 1:
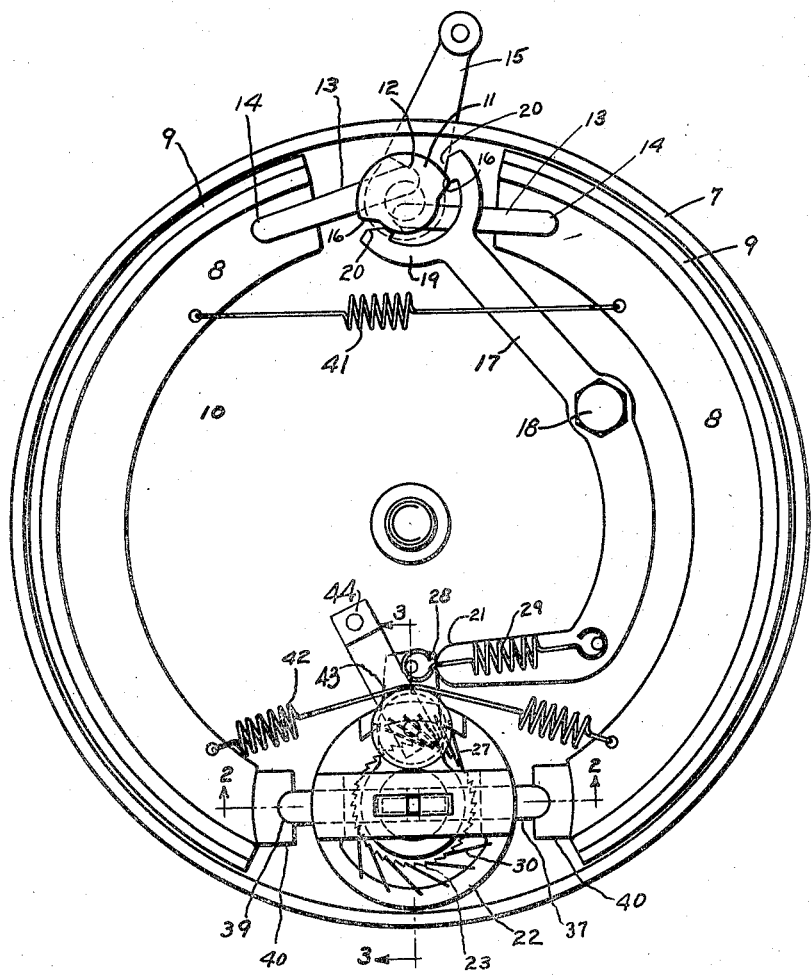
Fig. 1 is an elevation of the braking mechanism.
Figure 2:
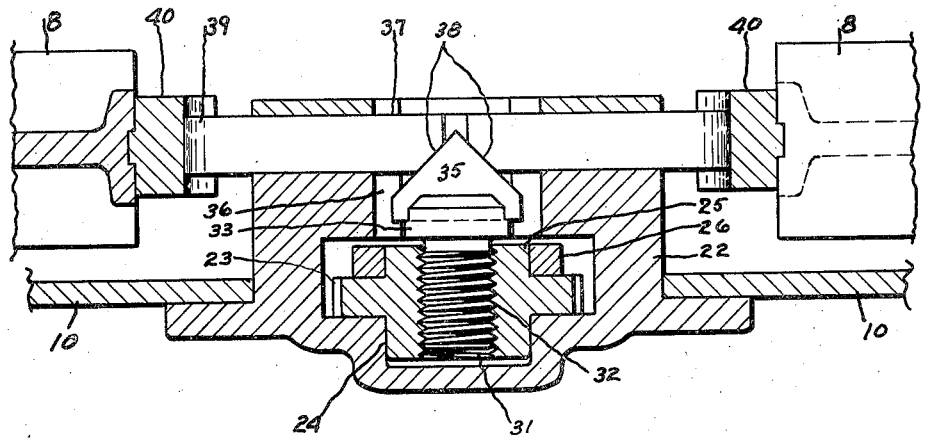
Fig. 2 is a sectional view along the line 2—2 of Fig. 1.
Figure 4:
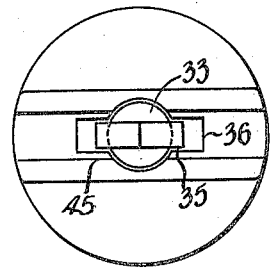
Fig. 4 is a detail of a portion of the mechanism.
Figure 3:
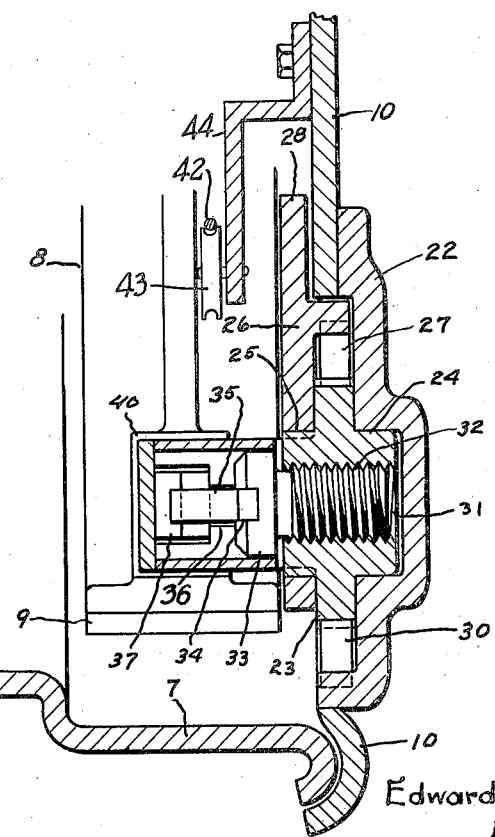
Fig. 3 is a sectional view along the line 3—3 of Fig. 1.

A preferred form of the invention may be found in the drawings in which character 6 indicates a conventional drum of a vehicle wheel to which is rigidly attached a cylindrical brake drum 7. Mounted within the drum 7 and adapted to bear on the inner surface thereof are curved brake shoes 8 lined with a suitable friction material 9. A fixed frame 10 carries the shoes 8 so that they are normally free of drum 7. Shoes 8 are free to move relative to frame or backing member 10.

Disposed between the upper ends of the brake shoe 8 is an operating cam 11 having eccentrically positioned recesses 12. Links 13 are pivoted at one end to the brake shoes 8 as at 14 and have their other ends fitted into recesses 12. A lever 15 is operably connected with cam 11 both of which are pivotally mounted on frame 10. Each of the several levers 15 is connected by brake rods or other means to a single operating lever or pedal, not shown, which the operator manipulates to actuate the brakes when in multiple.

A cam follower 17 is pivotally mounted on frame 10 as at 18 and is provided at its upper end with a bifurcation 19 the ends of which have beveled surfaces 20. The lower portion of follower 17 is curved and has an extension 21 which bears against the automatic adjustment device and holds it in position until the brakes are actuated.

A fixed housing 22 is rigidly attached to the stationary frame 10 and has a portion disposed between the lower ends of brake shoes 8. A ratchet wheel 23 is provided with hubs 24 and 25. Hub 24 rotatively fits in a recess in housing 22. Hub 25 serves as a mounting for ratchet lever 26 having inwardly projecting spring pawls 27 which engage the teeth of ratchet wheel 23. The outer or free end 28 of the ratchet lever 26 bears against the extension 21 of cam follower 17 under the action of tension spring 29 anchored to both by pins or the like.

Holding pawls 30, preferably of spring material, are mounted on an inner wall of housing 22 and so arranged that they engage the teeth of ratchet wheel 23 and prevent backward rotation thereof while not interfering with its forward or clockwise motion, as may be readily seen in Fig. 1. Ratchet wheel 23 is provided with a central threaded bore 31 in which is fitted adjusting screw 32. Adjusting screw 32 is provided at one end with a round head 33 in which is formed kerf 34. A wedge 35 is proportioned so as to fit into kerf 34 and move with screw 32.

The housing 22 is slotted as at 36 so as to engage the sides of wedge 35 and prevent rotation of screw 32 when ratchet wheel 23 is turned. Arms 37 are beveled at one end as at 38 to give a good sliding contact on the inclined sides of wedge 35. Arms 37 extend through slot 45 in housing 22 which serves as a suitable support and bearing for them. The ends of arms 37 opposite the beveled ends 38 are rounded as at 39 to fit into corresponding curved recesses in the lower projecting ends 40 of brake shoes 8 so as to provide a connection much like a ball and socket joint. Spring 41 is anchored in the upper ends and spring 42 in the lower ends of both brake shoes 8. They act to prevent them from contacting the brake drum 7 when not in use. The central portion of spring 42 runs over roller 43 mounted on bracket 44 thus permitting shifting of the shoes 8 bodily since wedge 35 will slide in kerf 34 of screw head 33. Spring 42 holds the shoes 8, arms 37 and wedge 35 in contact at all times.

In previous design of brakes there is provided a brake drum, suitable brake shoes lined with a moulded or woven braking medium, and means for expanding the brake shoes so as to bear against the brake drum. A screw or cam or like means for compensating for wear which normally takes place in the braking medium is provided. Great skill is required to adjust four such brakes, as on an automobile, so that all brakes will operate simultaneously with equal pressure. Many establishments invest in expensive equipment to determine the braking effect of each of the four wheels independently. Further, because of the absence of absolute uniformity of the composition and hardness of brake linings and brake drum surfaces, in a short period of time the brakes are again out of adjustment.

The invention operates in the following manner. When the vehicle operator applies the brake the force is transmitted by levers and rods to lever 15 which rotates and carries with it cam 11. During this initial rotation of lever 15 the brakes are not applied, that is placed in braking contact with drum 7. As cam 11 turns, follower 17 is rotated by quick throw, cam surfaces 16. In Fig. 1 the rotation of follower 17 would be counterclockwise which would tend to separate extension 21 and free end 28 of ratchet lever 26 which tends to follow extension 21 because of the action of spring 29. Rotation of lever 28 is transmitted through pawls 27 to ratchet wheel 23. This in turn causes longitudinal movement of screw 32 which is held against rotation by wedge 35 and slot 36. This causes translation of wedge 35 and the outward movement of arms 37 until shoes 8 contact the inner wall of drum 7 with a certain predetermined force.

At this point the lower ends of the shoes of all the brakes of a vehicle are contacting the drums with the same force. This movement is an adjusting movement, not a braking movement. Continued motion of lever 15 forces the upper ends of shoes 8 apart by action of links 13 in slots 12. This causes braking action between the shoes and the drum. When the brake is in adjustment spring 29 cannot rotate lever 28 since the drum prevents further separation of the lower ends of the shoes 8. Extension 21 and lever 28 merely separate and no movement is transmitted to ratchet 23. The springs 29 and 42 are chosen so as to have the same constants on all four brakes of a car. Where one shoe wears more than the other, the shoes can adjust themselves and the central portion of spring 42 will ride on roller 43, and wedge 35 will slide in kerf 34. At first the shoes are moved evenly toward the drum until the shoe with the thicker lining contacts the drum. This shoe meets the drum and stops, but the wedge continues to advance. It now slides in kerf 34 as well as continuing its previous movement. This movement continues until the second shoe contacts the drum in exactly the same manner as the first shoe. Any additional movement of arm 17 stretches spring 29 and since lever 26 cannot move after the shoes 8 contact the drum, extension 21 and lever 26 separate. Springs 41 and 42 tend to hold the shoes 8 out of operative contact with the drum 7 until the brakes are applied.

It follows that any wear, however minute, on any part or parts that might affect brake action will be immediately and continuously compensated for. Since any adjustments must take place before the brakes become tight, it is impossible to set the brakes without first adjusting for wear in any individual or all brakes. Further, since at the instant that the cam follower 17 rocks, the brake shoes must be in light contact with the brake drum 7, a definite and constant additional movement of the operating lever will set the brakes tightly. It follows that a certain movement of the operating lever or brake pedal will give a corresponding set of the brakes throughout the useful life of the brake linings and that this relationship is constant even though one individual brake may be subject to more wear than the others due to abnormal conditions or all the brakes are nearly worn out. This eliminates the tight and lose pedal entirely.

The movement of extension 21 will always be sufficient to permit enough movement of lever 28 to cause the lower ends of shoes 8 to lightly contact drum 7 in the adjusting portion of the stroke of lever 15.

It will be seen that the cam 11 and follower 17 control the time or period during which adjustment may take place. They are here positioned so as to act in the instant before the brakes are set for effective braking and shoes 8 come into tight contact with the drum 7. The followers 17 on all the brakes should operate substantially simultaneously for best results.

A clearance of $3/64''$ to $1/16''$ is provided between arms 37 and the slot 45 in housing 22 which serves as a suitable support and bearing for them. This construction permits spring 42 to lift shoes 8 away from drum 7 when not in use. The first movement of lever 15 which starts expanding the shoes 8 at the top will also force them down and the clearance between drum 7 and lining 9 will be practically the same at the top and bottom of shoes 8.

While the above is a description of one form of the invention in detail it is intended as illustrative and not as limiting. Many changes may be made without departing from the spirit of the invention.

I claim:

1. In a vehicular brake, a drum, brake shoes, an operating lever, expanding links and a cam actuated by said operating lever, a rocker arm actuated by said cam, a ratchet wheel actuated by said arm, a wedge between said shoes and actuated by said wheel, said wedge constructed so as to separate said shoes for necessary adjustment, said cam being set so as to act on said rocker arm prior to effective braking.

2. In a vehicular brake, operating means having a cam and brake applying means mounted thereon, brake shoes operably connected with said brake applying means and supported on movable means comprising separable portions, means actuated by said cam adapted to separate said separable portions whereby said shoes are placed in accurate adjustment, said last named means being so constructed and arranged that any necessary adjustment of one shoe continues after another is in adjustment.

3. In a vehicular brake, operating means, brake shoes, movable arms acting on said shoes, a movable member so constructed and arranged as to be capable of selectively moving said arms to place said shoes in adjusted position, said movable member being actuated by a quick throw cam and follower mechanism which tests the shoes for adjustment and moves said movable member, a lost motion connection between said follower and said movable member whereby said follower may move when said shoes are in adjustment and said movable member meets resistance and whereby said movable member may move less than its maximum distance and said follower may move through a complete cycle.

4. In a vehicular brake, operating means, brake elements, a brake drum, adjusting means, means coupling the operating means and the adjusting means, said coupling means so positioned that initial operation of said operating means actuates said adjusting means and causes a portion of each of said brake elements to move just enough to lightly contact the braking surfaces of said brake drum whereby the surfaces of said brake elements and said drum are always in exactly the same relative positions immediately prior to effective braking, said brake elements being so associated with said operating means that continued operation of said operating means acts to force said brake elements into effective braking position.

5. In a vehicular brake, operating means, brake elements, a brake drum, adjusting means, means coupling the operating means and the adjusting means, brake element actuating means operated by said operating means, said coupling means being so constructed and kinematically arranged that it operates the adjusting means before the actuating means effectively apply the brakes whereby the brake elements are adjusted relative to said drum prior to effective braking.

6. In a vehicular brake, operating means, brake adjusting means, quick throw cam means operated by said operating means and so positioned that it actuates said adjusting means prior to effective braking.

7. In a vehicular brake, operating means, connected by coupling means to brake applying means and brake adjusting means, said coupling means being so constructed and positioned that upon operation of the operating means it actuates said adjusting means and effects adjustment of the brakes before it causes said brake applying means to take the position for effective braking.

8. A brake comprising a drum, friction means, automatic adjusting means therefor, said adjusting means being actuated by a quick throw cam means having a dwell whereby said adjusting means is actuated by the quick throw portion of the kinematic cycle of said cam means.

9. In a brake, operating means, automatic adjusting means, brake applying means, means operatively connecting said operating means with said adjusting means and said brake applying means, said connecting means having a cam-like surface for actuating said adjusting means, said connecting means having said brake applying means pivoted thereon in such a manner as to provide an effective leverage.

10. In a vehicular brake operating means, brake shoes, brake adjusting means including quick acting cam means actuated by said operating means and acting through intermediate means to individually adjust said shoes, said intermediate means comprising movable means adapted to move said shoes into adjusted position and so constructed that upon the proper adjustment of one shoe the movable means ceases to move the adjusted shoe and continues its movement until the other shoe is in adjusted position.

11. In a brake, brake shoes, operating means, automatic adjusting means for said shoes comprising slidable means and movable means for moving said slidable means in a direction substantially transverse to the direction in which it is slidable, brake applying means, said adjusting means and said applying means both being actuated by said operating means.

12. A brake comprising, brake shoes, a drum, brake shoe operating means, automatic adjusting means actuated by said operating means and so arranged that it tests each shoe for adjustment and causes portions of each shoe to lightly contact said drum and assume adjusted position, said adjusting means including lost motion means whereby only that portion of the movement of said operating means needed for adjustment is utilized in effecting the adjustment.

13. In a brake, operating means, brake elements, a brake drum, adjusting means, means coupling the operating means and the adjusting means, said adjusting means including slidable means and movable means for moving said slidable means substantially transverse to the direction in which it is slidable.

14. In a brake, operating means, brake shoes, adjusting means including cam means, cam follower means and means arranged to move said brake shoes relative to each other, said means actuated by said follower means through a lost motion connection whereby said means moves just enough to adjust said shoes and additional movement of said follower means is allowed for by said lost motion connection.

15. In a brake, operating means, brake shoes, adjusting means, link means connected to the shoes and actuated by the operating means, cam means operatively associated through intermediate means with said adjusting means and actuated by said operating means, the kinematic cycle of operation being such that said cam means actuates said adjusting means before said link means forces the shoes into effective braking position.

16. In a brake, brake shoes, operating means, automatic adjusting means actuated by said operating means and comprising movable arms contacting said shoes, a slidable wedge between said arms and adapted to separate them, an elevating screw having a kerf in which said wedge is slidably seated, means for elevating said screw and lost motion means actuating said elevating means.

17. In a brake adjusting means, a quick throw cam, a pivoted cam follower, a ratchet having an extending lever, resilient means connecting said cam follower and said lever, an elevating screw threaded in a movable portion of said ratchet, a kerf in said screw and a wedge slidably positioned in said kerf, two oppositely extending arms bearing at one end upon the inclined surfaces of said wedge and at the other upon brake shoes adapted to be adjusted.

18. In a brake, a drum, brake shoes, means to effectively apply said shoes to said drum for effective braking, means adapted to move said shoes with respect to said drum and adjust them, means normally holding said shoes out of contact with said drum, moveable means actuating said means adapted to move said shoes, said moveable means being so positioned with respect to the means adapted to move the shoes that said last named means is actuated and the shoes are adjusted prior to the effective application of the brake shoes to the drum.

19. In a brake adjusting means, brake shoes having sockets, arms fitting in said sockets and separated by a slidable wedge, moveable means to move said wedge and separate the arms, automatic means adapted to prevent return movement of said moveable means, and means coupling said moveable means to brake operating means whereby automatic adjustment is obtained.

20. In a vehicular brake, brake shoes, operating means, brake adjusting means, quick throw cam means operated by said operating means and so positioned that it actuates said adjusting means prior to effective braking and resilient means normally holding the brake shoes in a retracted position.

EDWARD J. NACHTWEY.